(12) United States Patent
Fowe (10) Patent No.: US 9,200,910 B2
(45) Date of Patent: Dec. 1, 2015

(54) RANKING OF PATH SEGMENTS BASED ON INCIDENT PROBABILITY

(71) Applicant: HERE Global B.V., Veldhoven (NL)

(72) Inventor: James Adeyemi Fowe, Evanston, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/103,479

(22) Filed: Dec. 11, 2013

(65) Prior Publication Data

US 2015/0160024 A1 Jun. 11, 2015

(51) Int. Cl.
*G01C 21/00* (2006.01)
*G01C 21/34* (2006.01)
(52) U.S. Cl.
CPC .................................. *G01C 21/34* (2013.01)
(58) Field of Classification Search
None
See application file for complete search history.

(56) References Cited

U.S. PATENT DOCUMENTS

| 6,466,862 | B1 | 10/2002 | DeKock et al. |
| 7,908,076 | B2 | 3/2011 | Downs et al. |
| 2006/0122846 | A1* | 6/2006 | Burr et al. ........................ 705/1 |
| 2009/0189979 | A1 | 7/2009 | Smyth |
| 2010/0036599 | A1* | 2/2010 | Froeberg et al. ............. 701/200 |

FOREIGN PATENT DOCUMENTS

| EP | 2023308 | 2/2009 |
| WO | WO0007113 | 2/2000 |

* cited by examiner

*Primary Examiner* — Adam Alharbi
(74) *Attorney, Agent, or Firm* — Lempia Summerfield Katz LLC (57) ABSTRACT

A route is selected based on the likelihood that an incident will occur while traveling on the route. An apparatus receives request for routing to a destination and identifies alternative routes to the destination. The apparatus selects a time interval based on a current time or another future time selected by a user. A comparison is performed for incident probabilities for the alternative routes and assigned to the time interval. The apparatus selects one of the alternative routes based on the incident probabilities.

21 Claims, 9 Drawing Sheets

| Time | Risk Probability Weights |
|---|---|
| t = 0 | 0.02 |
| t = 1 | 0.2 |
| t = 3 | 0.01 |
| ⋮ | |
| t = T | 0.0003 |

# RANKING OF PATH SEGMENTS BASED ON INCIDENT PROBABILITY

FIELD

The following disclosure relates to incident probabilities, or more particularly, a ranking of path segments based on incident probabilities.

BACKGROUND

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location, the navigation system can examine various potential routes between the origin and destination locations to determine the optimum route.

The navigation system may provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

Although navigation systems provide many important features, there continues to be room for new features and improvements. For example, navigation systems typically select the shortest or fastest route as the optimum route. However, the shortest or fastest is not also the most preferred route by the user.

SUMMARY

In one embodiment, a route is selected based on the likelihood that an incident will occur while traveling on the route. An apparatus receives request for routing to a destination and identifies alternative routes to the destination. The apparatus selects a time interval based on a current time or another future time selected by a user. A comparison is performed for incident probabilities for the alternative routes and assigned to the time interval. The apparatus selects one of the alternative routes based on the incident probabilities.

BRIEF DESCRIPTION OF THE DRAWINGS

Exemplary embodiments of the present invention are described herein with reference to the following drawings.

DETAILED DESCRIPTION

Routing information in mapping software application and in vehicle navigation devices may naively assume that all drivers prefer the shortest and/or fastest route to a destination. However, some risk averse drivers may prefer a longer but safer route to the destination. The following embodiments include systems and algorithms that automatically rank path segments based on the likelihood of an incident occurring on the path segments. In one example, one or more series of path segments form one or more potential routes. The potential routes may be compared based on the likelihood of an incident occurring on the potential routes. The potential routes may be ranked based on the comparison. The highest ranking potential route, which corresponds to the lowest likelihood of an incident occurring on the route, may be provided to a user in response to a request for navigation.

The likelihood of an incident occurring for a path segment may be based on an incident probability. The incident probability may be a product of a distance of the path segment and an incident rate per unit distance. The incident rate may include various types of incidents such as vehicle accidents, construction incidents, traffic incidents, or other incidents that effect traffic.

The incident probabilities or the ranking of path segments or routes may be used for traffic applications, personalized risk routing, or other navigation applications. The traffic applications report traffic conditions on roadways. The traffic conditions may include traffic speed and incident probabilities. Personalized risk routing allows users to specify a risk level. The risk level defines a tradeoff between the estimated time to travel the route and the risk of an incident along the route. In one example, the incident probabilities or the ranking of path segments or routes are used by an advanced traveler information system (ATIS) along with information obtained within a vehicle (e.g., autonomous driving system) and/or information supplied by a traffic management system.

A mathematical model may compute time-dependent incident probabilities based on peak and off-peak time periods or a Poisson based time dependent incident probability model. The model uses the historical incident data for each road segment and the real-time traffic condition to estimate probability of incidents.

Figure 1:
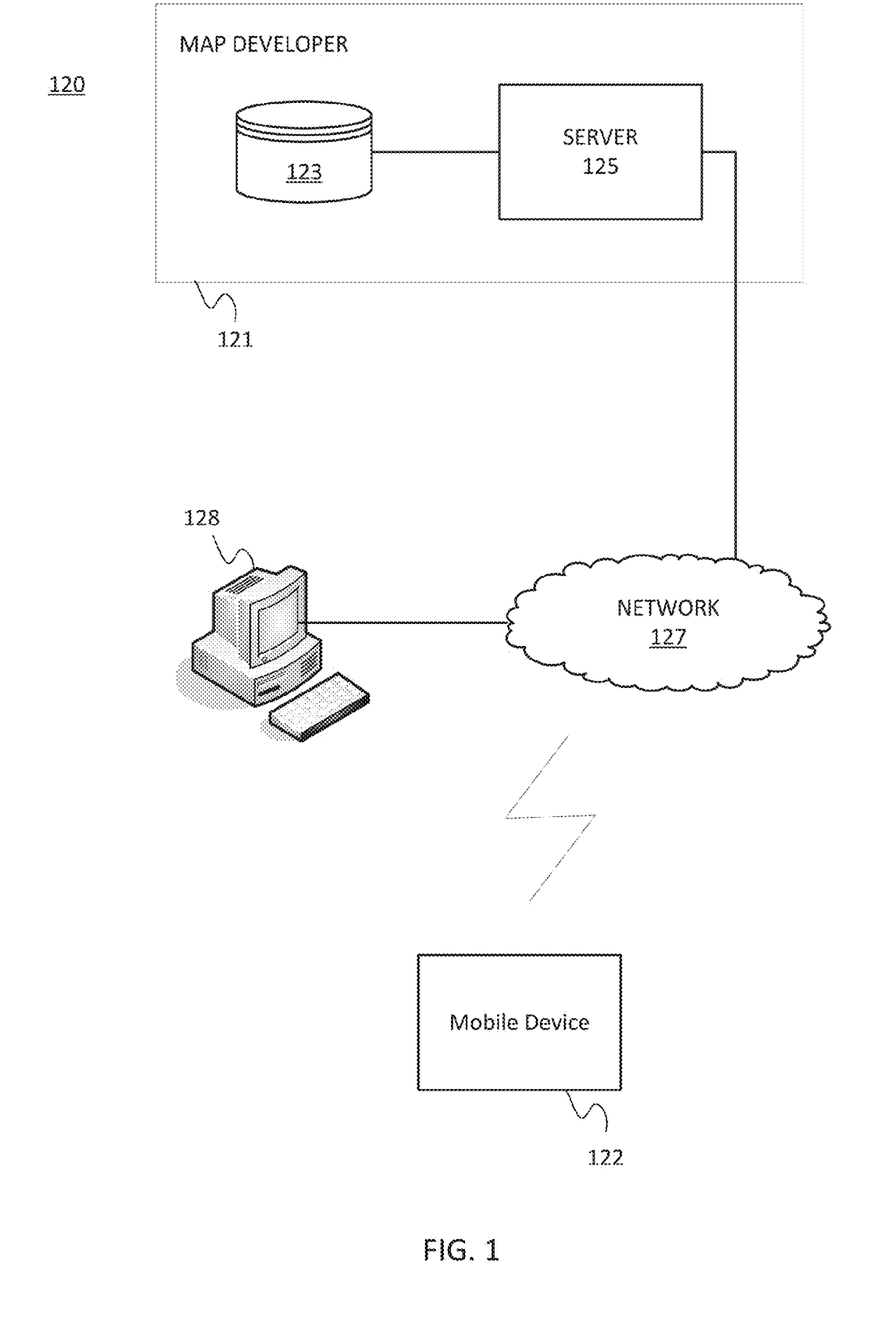
FIG. 1 illustrates an example navigation system for ranking of path segments based on incident probability.

FIG. 1 illustrates an example navigation system 120 for ranking of path segments based on incident probability. The navigation system 120 includes a developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The developer system 121 may include computer systems and networks of a system operator (e.g., HERE, NAVTEQ or Nokia Corp.).

The mobile device 122 may receive a request for routing to a destination from a user. The request may specify the destination, a point of interest, or any type of text search. The server 125 is configured to receive the request for routing from the mobile device 122 via the network 127.

The server 125 or database 123 may be configured to store possible routes to the destination. Each route comprises a path from an origin to the destination. The routes comprise path segments. The routes may include one or more common path segments, but each route differs from each other route by at least one path segment.

Each path segment of the possible routes is associated with an incident rate and a distance of the path segment. The incident rate may describe a predicted chance of an incident occurring on the path segment or for each unit length of the path segment. The incident rate may be constant for the path segment at all times. The incident rate may be variable such that different incident rates are associated with different time intervals or time epochs. Example sizes for the time epochs include 15 minutes, 30 minutes, 1 hour, or another value. In the example of 15 minute epochs, the data is formatted into 96-dimensional daily vectors, in which each of the 96 components describes the incident rate for a different 15 minute epoch.

The incident rate may be based on historical data. In one example, the historical data includes incidents reports as collected by one or more of the police, ambulance, fire, or other government or other quasi-government entity. The National Highway Traffic Safety Administration (NHTSA) may collect and maintain the historical data (e.g., using real time data or census type data of the Fatality Analysis Reporting System (FARS)).

The incident reports may include the location and times of vehicle accidents organized by path segments. The incident reports may also include the location and times of traffic disturbances, hazardous weather, or other events. In one example, the incident rate is based on traffic wait times, which may be collected by traffic cameras, traffic sensors adjacent to the path segments, or by mobile devices. The mobile devices may act as probes that report back position data from a global positioning system (GPS).

The server 125 is configured to perform a comparison of incident probabilities for the possible routes for one or more time intervals. The incident probabilities may be calculated from an incident rate per unit length for a path segment and the length of the path segment. The server 125 may be configured to select one of the possible routes based on the incident probabilities.

Figure 2:
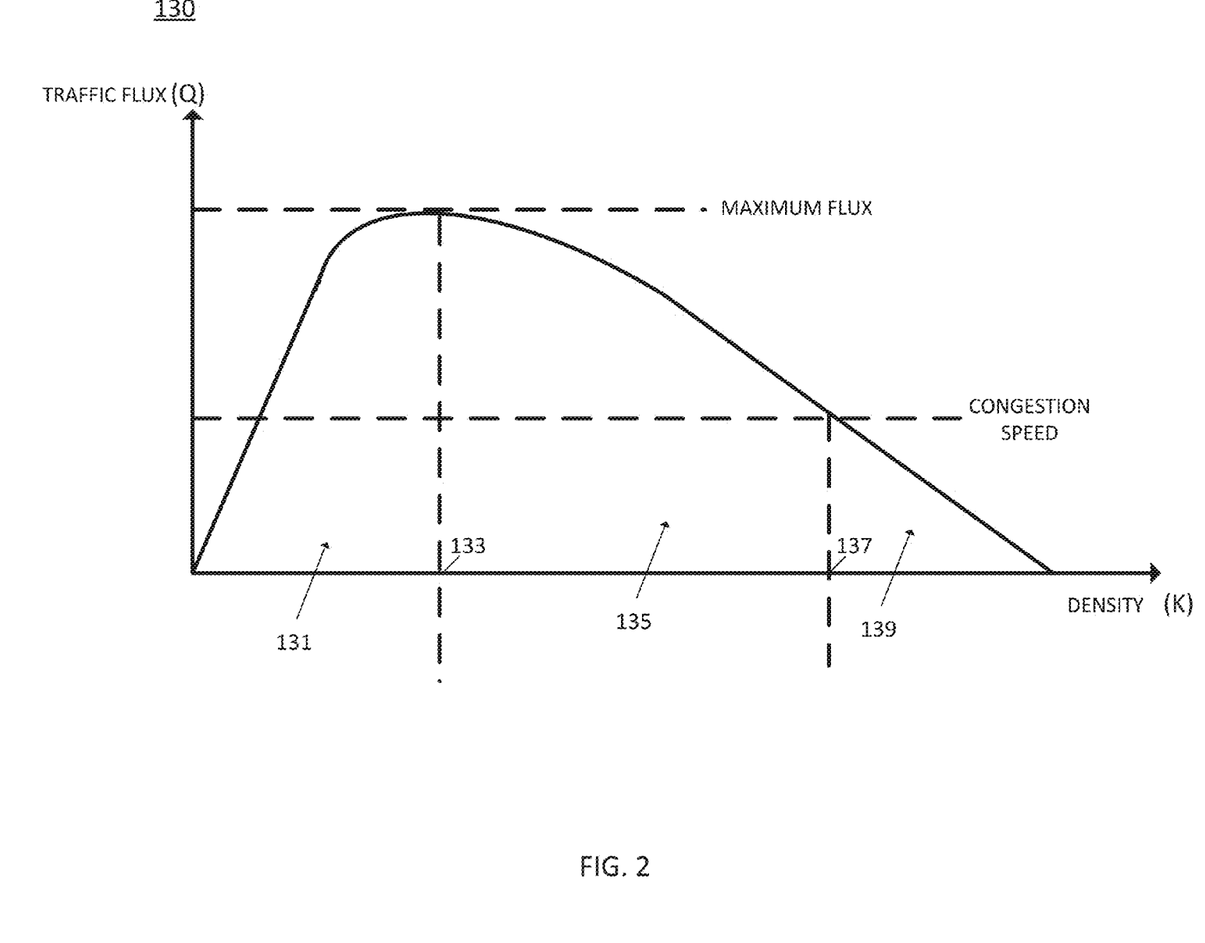
FIG. 2 illustrates an example chart for traffic flow.

FIG. 2 illustrates an example chart 130 for traffic flow. The vertical axis of the chart 130 represents traffic flow, which may be represented as Q. Traffic flow may be measured in the number of vehicles per unit time. The horizontal axis of the chart 130 represents traffic concentration or traffic density, which may be represented as K. Traffic concentration may be measured in the number of vehicles per unit distance of the path.

The chart 130 illustrates the relationship between traffic flow, traffic speed and traffic density or volume. The chart 130 includes a stable region 131 and an unstable region 135. The stable region 131 and the unstable region 135 are divided at or near a critical density ($K_c$) 133. In the stable region 131, an increase in traffic density can be easily handled by the road. Traffic flow increases proportional to traffic density in the stable region 131.

In the unstable region 135, an increase in traffic density tends to decrease traffic flow. At some point, a traffic congestion threshold 137, the traffic flow decreases to the point of traffic congestion. The speed indicative of traffic congestion (congestion speed) is a speed that is near zero or low enough to significantly impede traffic. The congestion speed may be defined by a predetermined speed (e.g., 5 miles per hour, 10 miles per hour, or another value).

The stable region 131 includes a positive relationship between traffic density and traffic flow. Thus, traffic flow is a function of traffic density having a positive slope. The unstable region 135 includes a negative relationship between traffic density and traffic flow. Thus, traffic flow is a function of traffic density having a negative slope.

Figure 3:
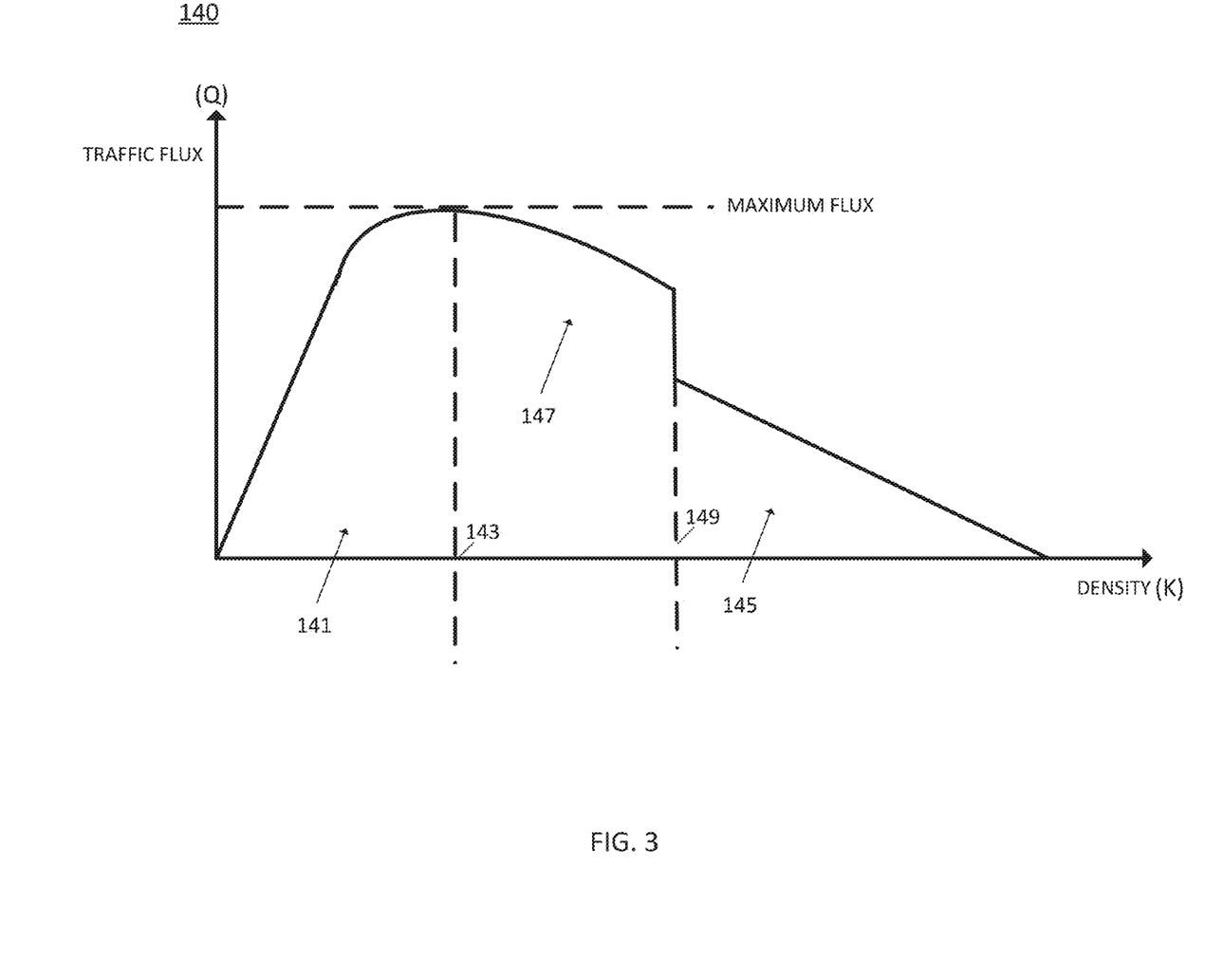
FIG. 3 illustrates another example chart for traffic flow.

FIG. 3 illustrates another example chart 140 for traffic flow. The chart 140 includes a stable region 141 and an unstable region 145 as described above. The chart 140 also includes a metastable region 147. The metastable region 147 borders the stable region 141 at a first critical density 143 and borders the unstable region 145 at a second critical density 149. In the metastable region 147, traffic flow has started to slow as a result of traffic density. However, no congestion or traffic jam results until the traffic density reaches the second critical density 149.

Figure 4:
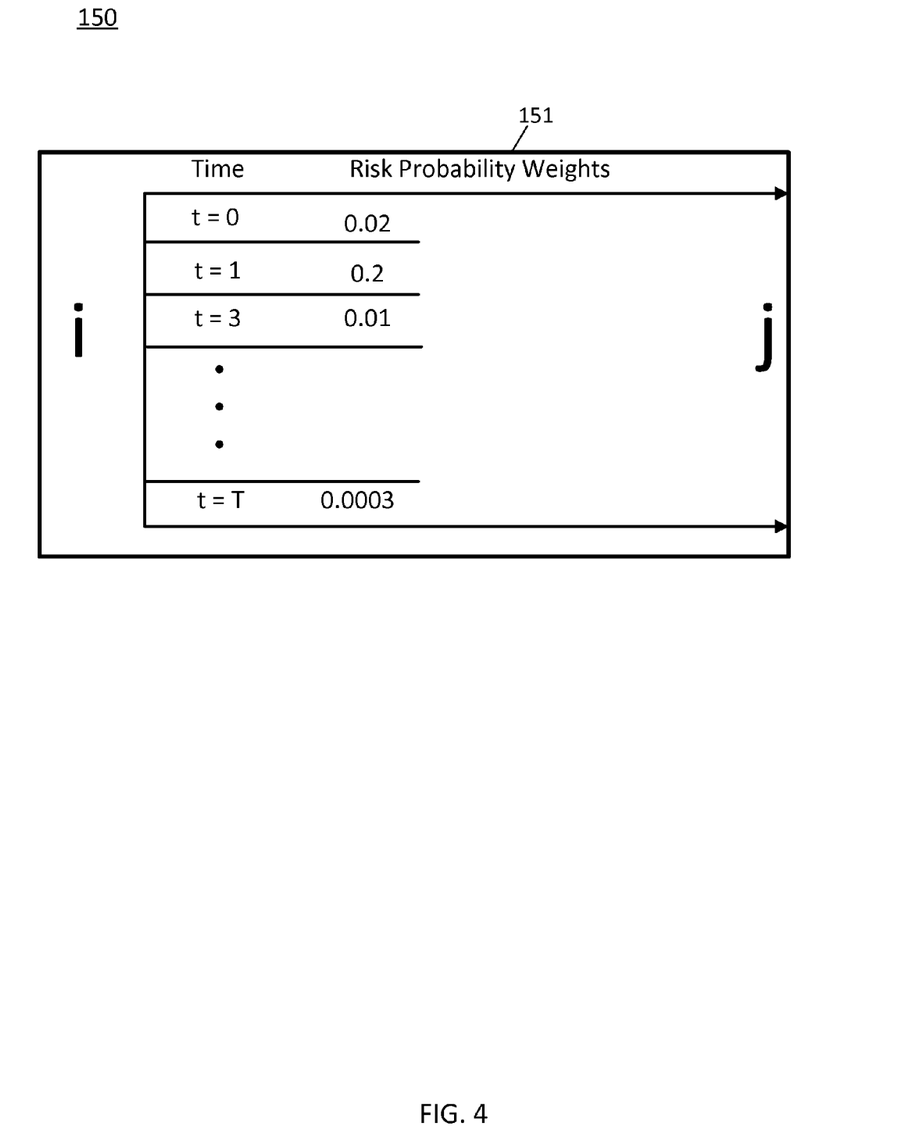
FIG. 4 illustrates an example chart for time intervals.

FIG. 4 illustrates an example table 150 for time intervals. The table may associate time intervals with risk probability weights or incident rates. The time intervals may be sequentially numbered (e.g., 1, 2, 3) or labeled by time epoch (e.g., 0830, 1745, 1230). Using the historical data of traffic information, incident prone routes may be determined. Incident prone routes may be identified either through the realized travel time information or the frequency of incidents (average number of incidents) on respective road segment over a particular time period. Because off-peak times in transportation network is generally less incident prone, it may be a waste of time for a risk averse driver to avoid particular road segments during off-peak times if those particular road segments are only considered incident prone during peak times. Accordingly, the table 150 associated incident rates with particular times.

The incident rates are time varying and may be a stored as a function of time for specific road segments or specific routes. The incident rates may be combined with non-time varying or static characteristics of the road segments. The static characteristics may include width of the path, slope, elevation, speed limit, or other characteristics. The incident rates may be time varying for a specified period (e.g. during the daytime peak traffic period) and static or non-time varying for nighttime (e.g. during the non-peak traffic period such as 12 A.M. to 5 A.M.). The time varying periods are shown by the numeric identifier (e.g., t=1, t=3) and the static period is shown by t=T in FIG. 4.

Figure 5:
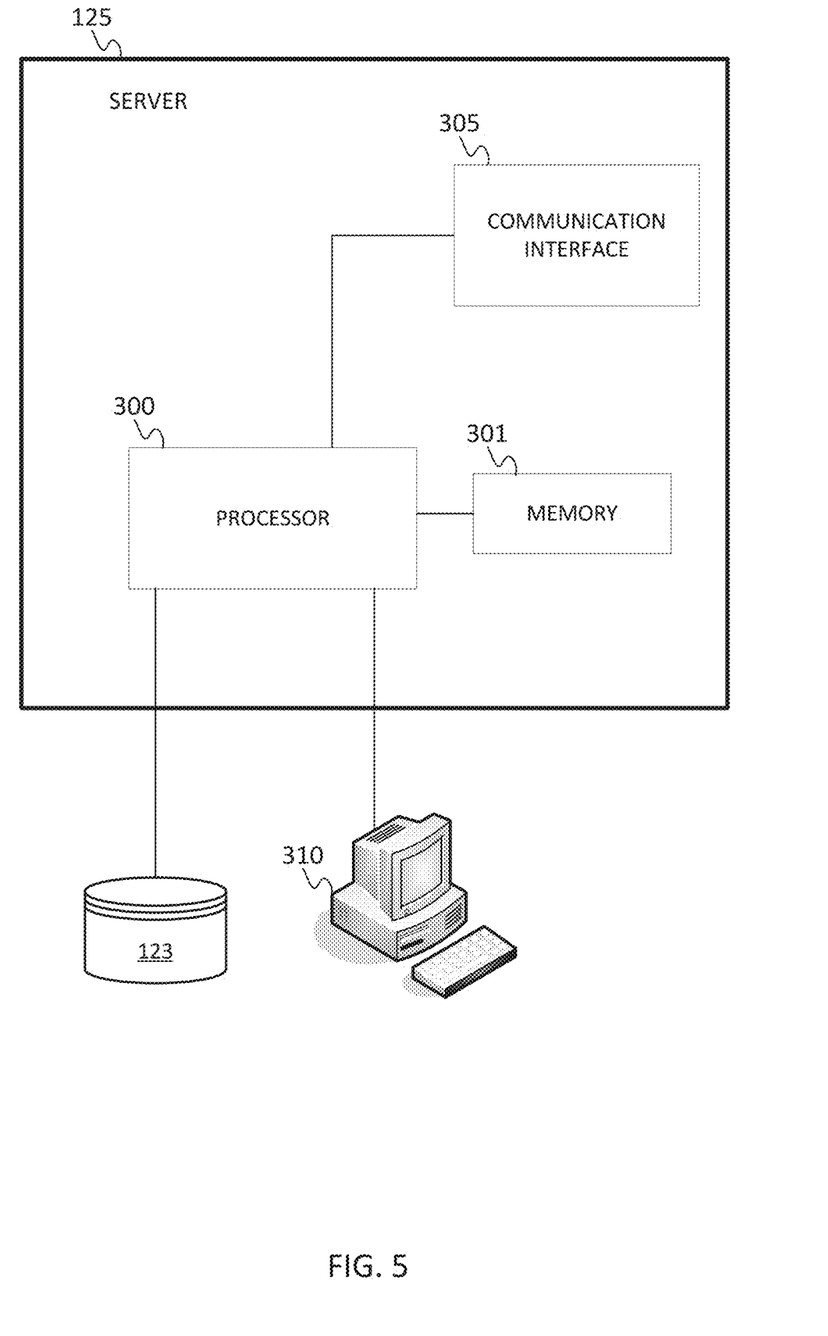
FIG. 5 illustrates an exemplary server of the system of FIG. 1.

FIG. 5 illustrates an exemplary server of the system of FIG. 1. The server 125 is configured to assign specificity to location-based names. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122. The processor 300 is configured to execute instructions stored in the memory 301 as computer program code for one or more programs for the various embodiment described herein.

The communication interface 305 receives data indicative of a destination. The destination may be an address, a point of interest, or a name of a business. The destination may be received from the mobile device 122 or another device in communication with the server 125. Data indicative of an origin may also be received similarly by the communication interface 305. Alternatively, the origin may be determined based on a current position of the mobile device 122.

The processor 300 is configured to identify a set of routes based on the destination or the origin and the destination. Each of the set of routes may comprise a series of path segments. The database 123 may store the path segments associated with a distance and an incident rate. An incident probability may be calculated as a function of the distance and the incident rate. Alternatively, the database 123 may store incident probabilities associated with path segments. The database 123 may index the incident rates or incident probabilities by time intervals.

The processor 300 is configured to calculate incident probabilities. The incident probabilities may be calculated based on incident rates and a current time or a projected time for traversing the route. The processor 300 receives data indicative of a current time. The processor 300 selects the predetermined time for the time interval based on the current time. In one example, the current time is the predetermined time. In another example, the predetermined time is a specific distance in the future that may be specified, for example, by a mapping application. The processor 300 may estimate when each path segment may be reached and select the corresponding time interval. The processor 300 access incident rates for the path segments for the identified routes from the database 123 according to the predetermined time.

The incident rate may be the likelihood of an incident for unit length of the path segment. Depending on the selection of the routes, the path segments in the series may be associated with a distance component. The distance component may be in the same unit length as the incident rate. Therefore, the processor 300 may calculate the incident probabilities from a produce of the distance component and the incident rate for each of the path segments or for the series of path segments.

The processor 300 is configured to select a preferred route from the plurality of routes based on a comparison of the incident probabilities for the series of path segments. In one example, the least risky route is selected regardless of the total length of the route. In another example, memory 301 stores a tradeoff value that defines a tradeoff between riskiness of the route and added distance to the route. In one example, the incident probability is a fractional value between 0 and 1. The tradeoff value may be a ratio of a difference in distance between to rates to a difference in incident probabilities between the two rates. Consider two proposed routes in Table 1.

TABLE 1

|  | Incident Probability | Total Distance |
| --- | --- | --- |
| Route 1 | 0.3 | 10 miles |
| Route 2 | 0.4 | 9 miles |

When the lowest incident probability is desired, route 1 is selected by the processor 300 even though route 1 is longer. When the shortest distance is desired, route 2 is selected by the processor 300 even though route 2 is longer. The tradeoff value may more precisely define this tradeoff. Example tradeoff values include 2, 5, 10, 50, 100 or any value. The difference in incident probabilities between route 1 and route 2 is 0.1 (0.4-0.3-0.1). The different in total distance between route 1 and route 2 is 1 (10 miles-9 miles=1 mile). The ratio of the difference in distances to the difference in incident probabilities is 10 (1/0.1=10). If the ratio exceeds the tradeoff value, the shorter route is preferred. If the tradeoff value exceeds the ratio, the longer but safer route is preferred.

A user of the navigation application or mapping application may specify a tradeoff value. In one example, the user specifies a general level of risk aversion, such has low risk (more risk averse), medium risk (less risk averse), or high risk (risk neutral). For example, memory 301 may store data indicative of a risk preference for the user. The processor 300 is configured to access the risk preference for the user and determine a tradeoff value based on the risk preference. In one example, low risk corresponds to a tradeoff value of 1000, medium risk corresponds to a tradeoff value of 100, and high risk corresponds to a tradeoff value of 1. The respective tradeoff values may correspond to a function that is linear, logarithmic, or exponential.

Figure 6:
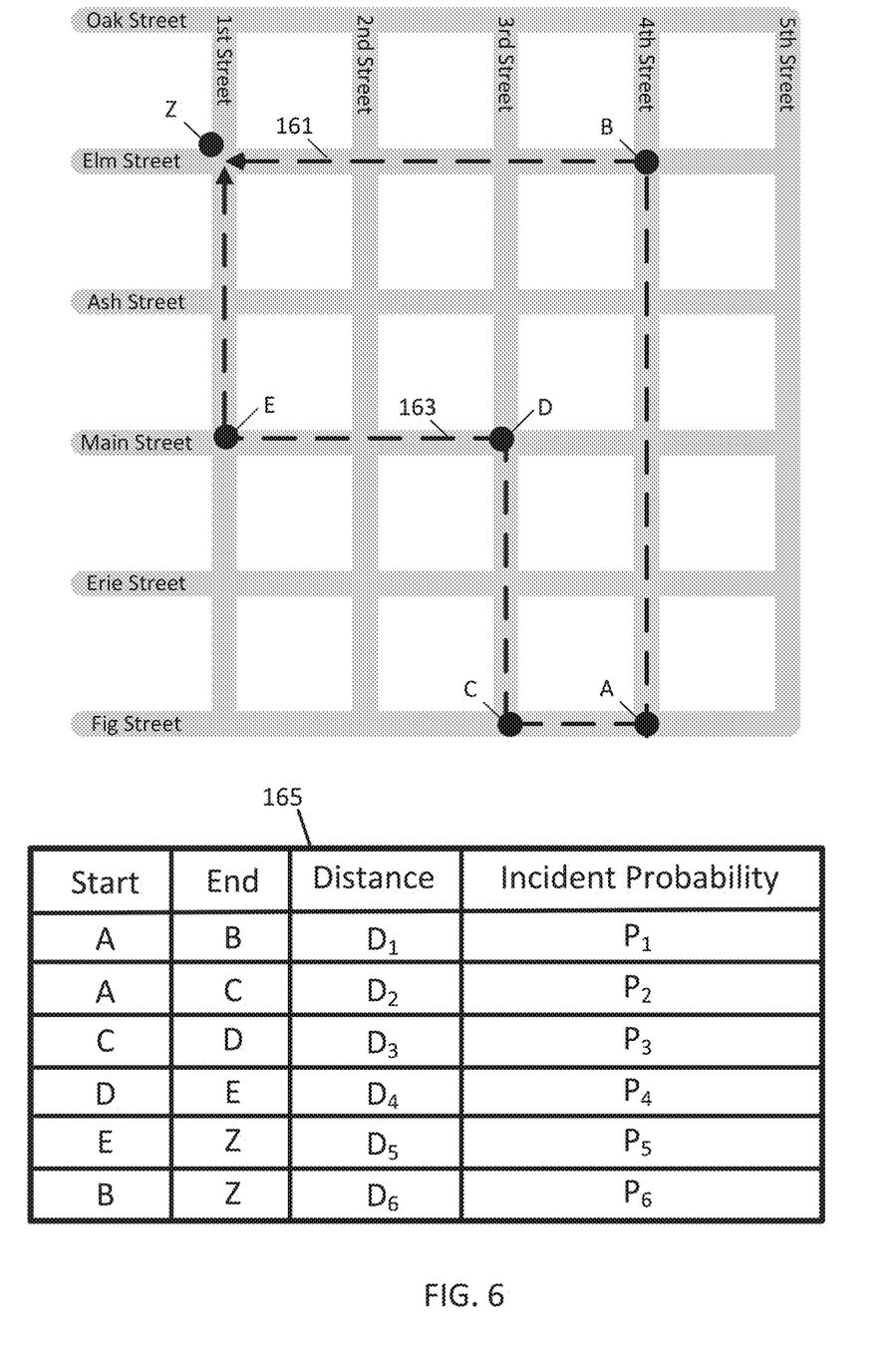
FIG. 6 illustrates path segments and incident probabilities.

FIG. 6 illustrates path segments and incident probabilities. The processor 300 is configured to sum incident probabilities of multiple path segments that make up a route. FIG. 6 illustrates two routes from point A to point Z. Route 161 extends from point A through point B to point Z. Route 163 extends from point A through points C, D, and E to point Z. Table 165 includes distances and incident probabilities for each of the segments. The processor 300 may be configured to sum $D_1$ and $D_6$ to calculate the distance of route 161, and sum $P_1$ and $P_6$ to calculate the incident probability of route 161. The processor 300 may be configured to sum $D_2$, $D_3$, $D_4$, and $D_5$ to calculate the distance of route 163 and, sum $P_2$, $P_3$, $P_4$, and $P_5$ to calculate the incident probability of route 163. The processor is configured to select either route 161 or route 163 based on the respective incident probabilities.

As a general rule, as traffic density increases, the chances for congestion also increase. Traffic flow may be described as a function of traffic density $K_{ij}$ and traffic velocity $V_{ij}$. Equation 1 defines the traffic flow on path segment from point i to point j. The path segment may be modeled mathematically as an arc (i, j).

$$Q_{ij} = K_{ij} V_{ij} \qquad \text{Eq. 1}$$

As shown by Equation 2, the incident probability $P_{ij}$ is directly proportional to the concentration, which may be represented as the average flux density $\overline{Q}_{ij}$ on arc (i, j) over the total time period. Accordingly, as shown by Equation 3, the incident probability $P_{ij}$ is also directly proportional to the travel time $d_{ij}$. The incident probability $P_{ij}$ may be inversely related to the length $L_{ij}$ of the arc.

$$P_{ij} \propto \frac{\overline{Q}_{ij}}{V_{ij}} \qquad \text{Eq. 2}$$

$$P_{ij} \propto \frac{d_{ij} \overline{Q}_{ij}}{L_{ij}} \qquad \text{Eq. 3}$$

The database 123 includes a set of time dependent risk probability metric values for each of the path segments. The probability of exposure to an incident for any particular path segment is dependent on the instantaneous time of the day. The parameters that determines the value of incident probability for the path segment are the instantaneous time t, travel time $d_{ij}(t)$ at time t, and an average incident rate $\lambda_{ij}$ of arc (i, j). The average incident rate may be a measure of the frequency of incidents on the path segment assuming a predetermined distribution of incidents. The predetermined distribution may be a normal distribution or a Poisson distribution.

Because the average flux density $\overline{Q}_{ij}$ and the length $L_{ij}$ are predetermined and exogenous to the model for each of the path segments, the ratio of average flux density to length may be replaces a constant value $\alpha_{ij}$. Equation 4 provides a time dependent incident probability model. A binary variable q indicates whether traffic is modeled as off-peak (q=1) or off-peak (q=0). A calibration constant $\beta$ is a scaling factor for adjusting or calibrating the model. In one example, distance as a function of time $d_{ij}(t)$ is greater than 1, and the calibration constant $\beta$ is between 0 and 0.5. In one example, the average incident rate $\lambda_{ij}$ is a fractional value between 0 and 1. The average incident rate $\lambda_{ij}$ may correspond to a percentage or a probability.

$$P_{ij}(t) = \beta(\lambda_{ij} + |1 - [\alpha_{ij} d_{ij}(t)]^{-q}|) \qquad \text{Eq. 4}$$

During peak times or when q=1, Equation 4 may be further reduced, as shown by Equation 5. During off-peak times or when q=0, Equation 4 may be further reduced, as shown by Equation 6.

$$P_{ij}(t)=\beta\lambda_{ij} \qquad \text{Eq. 5}$$

$$P_{ij}(t)=\beta(\lambda_{ij}+|1-[\alpha_{ij}d_{ij}(t)]^{-1}|) \qquad \text{Eq. 6}$$

Returning to the general case, Equation 4 may be reduced to Equation 7. By removing the calibration constant β and embedding it in the constant $\alpha_{ij}$, Equation 8 may be derived.

$$P_{ij}(t)=\beta\lambda_{ij}|q-[q+\alpha_{ij}d_{ij}(t)]-q| \qquad \text{Eq. 7}$$

$$P_{ij}(t)=\lambda_{ij}|q-[q+\alpha_{ij}d_{ij}(t)]^{-q}| \qquad \text{Eq. 8}$$

In another example, a more robust model can be used if the incident rate data is time dependent. Either as a function of time interval t, or as a function of peak versus off-peak periods. Let $\lambda_{ij}(q)$ be the incident rate function. In which $\lambda_{ij}(1)$ is the incident rate obtained at peak periods, and $\lambda_{ij}(0)$ obtained at off-peak periods, as shown by Equation 9. Further simplification is possible during off-peak periods, as shown by Equation 10.

$$P_{ij}(t)=\lambda_{ij}(q)|q-[q+\alpha_{ij}d_{ij}(t)]^{-q}| \qquad \text{Eq. 9}$$

$$P_{ij}(t)=\lambda_{ij}(0) \qquad \text{Eq. 10}$$

For real time ATIS systems, a more finely grained or continuous determination of peak and off-peak periods may be used to produce the optimal incident risk probability metrics. The binary switch on q (peak vs. off-peak) is triggered by $K_C$ the critical concentration at which traffic switch from stable to unstable or meta-stable traffic conditions.

In one example, the incident probability may depend on real time weather conditions. Weather conditions may include rain, snow, fog, wind, hail, or other weather conditions. The processor 300 may receive data generated by a weather sensor that describes a real time quantity of precipitation, visibility, or wind. The model may evaluate the real time weather condition into the incident probability measurement and the historical incident patterns of the particular weather conditions.

The real time quantity of rain may be described as a function of time by $R_{ij}(t)$. The real time quantity of snow may be described as a function of time by $S_{ij}(t)$. The model may also include an incident probability due to rain $\lambda_{ij}(r)$ and the incident probability due to snow $\lambda_{ij}(s)$. The binary variables r and s indicate if it is raining/snowing or not (e.g., s=0 represents not snowing, s=1 represents snowing, r=0 represents not raining, and r=1 represents raining). Equation 11 illustrates the extended model including individual real time weather conditions.

$$P_{ij}(t)=\beta[\lambda_{ij}(q)+\lambda_{ij}(r)+\lambda_{ij}(s)]\cdot|q+[q-\alpha_{ij}d_{ij}(t)R_{ij}(t)S_{ij}(t)]^{-q}| \qquad \text{Eq. 11}$$

In one example, fine grained historical data is available such that the relative dependencies between the historical interactions of rain r, snow s and peak traffic q is captured. In addition to the definitions of r and s above, q=1 indicates peak traffic and q=0 indicates off-peak traffic. Equation 12 illustrates another model including a combine incident rate as a function of peak traffic, rain, and snow. The function $\lambda_{ij}(q,r,s)$ is the combined historical incident data for different scenarios: $\lambda_{ij}(0,0,0)$ means historical incident rate when there is no rain no snow at off-peak traffic while $\lambda_{ij}(1,0,1)$ means historical incident rate when there is snow in peak traffic period.

$$P_{ij}(t)=\beta\lambda_{ij}(q,r,s)|q+[q-\alpha_{ij}d_{ij}(t)R_{ij}(t)S_{ij}(t)]^{-q}| \qquad \text{Eq. 12}$$

In one embodiment, the probability of incidence on a path segment, which may be an arc (i, j) may be modeled as a Poisson process. The Poisson process describes the probability of a given number of events occurring in a fixed interval of time when the events occur at a predictable average rate and independently of the time since the last event. Given $\lambda_{ij}$ the incident rate on an arc(i, j), the probability of risk on arc (i, j) may be a function of the random variable N (number of incidents) on the path segment for time period t (total time of exposure to the link). Equation 13 is an example of the Poisson probability of having k number of incidents on a path segment (e.g., arc (i, j)). Equations 14 and 15 describe the probability of occurrence of at least one incident.

$$P(N=k) = \frac{e^{-\lambda t}(\lambda t)^k}{k!} \qquad \text{Eq. 13}$$

$$P(N \geq 1) = 1 - P(N=0) \qquad \text{Eq. 14}$$

$$P(N \geq 1) = 1 - \frac{e^{-\lambda t}(\lambda t)^0}{0!} = 1 - e^{-\lambda t} \qquad \text{Eq. 15}$$

Equation 16 describes that for a given $d_{ij}(t)$ as the total time a driver is expected to commute (exposed to incidence) through arc(i, j) at instantaneous time t, then the probability of risk on arc(i, j) can be expressed as:

$$P_{ij}(t)=1-e^{-\lambda_{ij}d_{ij}(t)} \qquad \text{Eq. 16}$$

Figure 7:
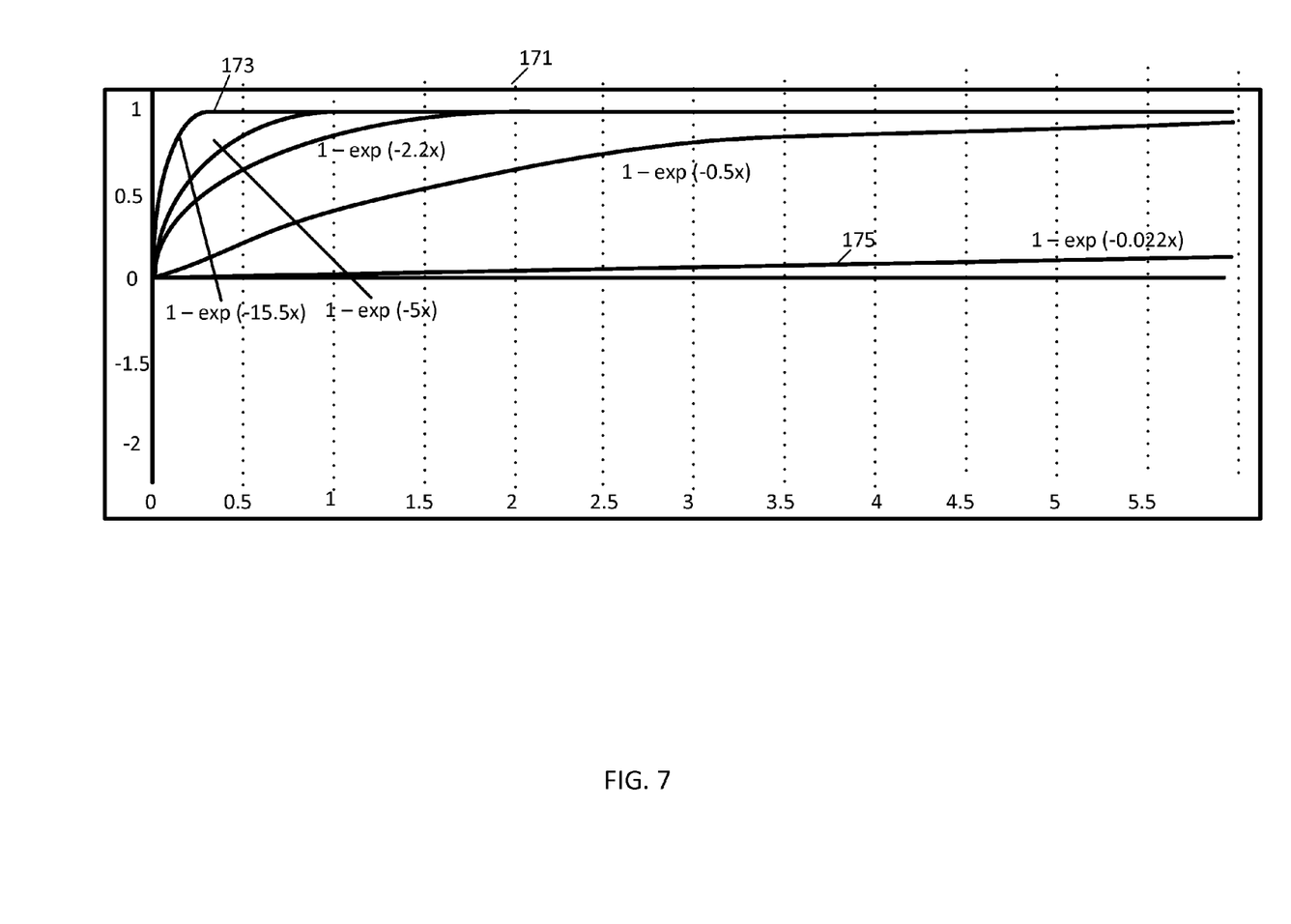
FIG. 7 illustrates an example chart of probability functions.

FIG. 7 illustrates an example chart of probability functions for another embodiment including a Poisson incident probability model. The function plot of Equation 16 for different values of $\lambda_{ij}$ (x-axis) as shown in FIG. 7 indicates that the higher the incident rate $\lambda_{ij}$ the faster the rise of the probability curve approaches 1. The highest is $\lambda_{ij}$ (15.5) plotted as line 173, while the lowest value of $\lambda_{ij}$ (0.022) is plotted as line 175. Equation 17 describes an example Poisson model where the function $\lambda_{ij}(q,r,s)$ is the combined historical incident data for different scenarios.

$$P_{ij}(t)=1-e^{-\lambda_{ij}(q,r,s)d_{ij}(t)} \qquad \text{Eq. 17}$$

Figure 8:
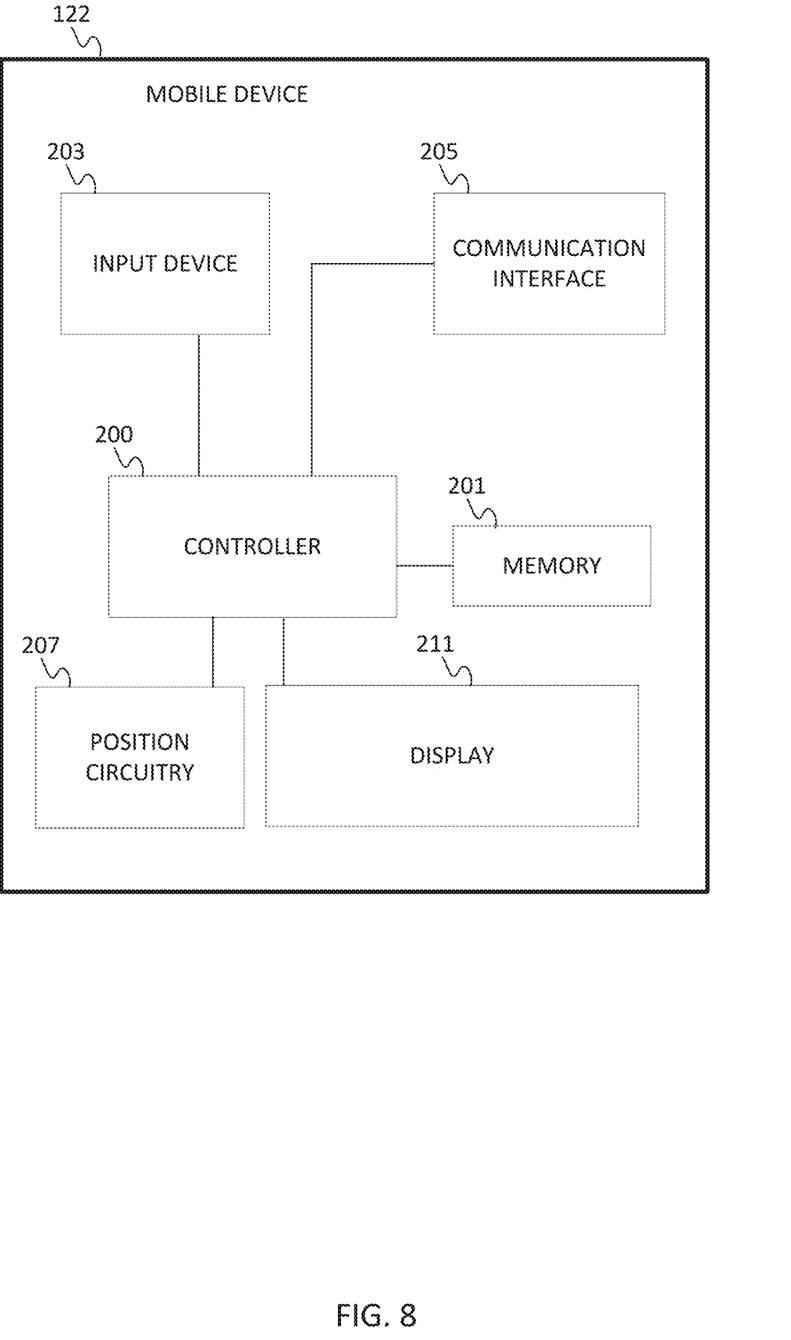
FIG. 8 illustrates an exemplary mobile device of the system of FIG. 1.

FIG. 8 illustrates an exemplary mobile device of the system of FIG. 1. The mobile device 122 may be referred to as a navigation device. The mobile device 122 includes a controller 200, a memory 201, an input device 203, a communication interface 205, position circuitry 207, and a display 211. The workstation 128 may include at least a memory and processor and may be substituted for the mobile device in the following endpoint-based embodiments. In the following endpoint-based embodiments, the mobile device 122 or the workstation 128 performs a majority of the processing.

The mobile device 122 may execute a mapping application or a navigation application, stored in memory 201 and executed by controller 200, in which a user selects a destination. The mobile device 122 may calculate a route to the destination using controller 200 or the mobile device 122 may send the information of the destination to the server 125 for selection of the route via the communication interface 205. In either case, the selection of the route may be made as function of incident probabilities on the potential routes as described in various implementations above.

The input device 203 or workstations 128 may be configured to receive user inputs. The user inputs may include a destination for the route. Alternatively, the user inputs may include a business name, an address, or a point of interest from which the destination is derived. In one example, an origin for the route is determined based on a current location of the mobile device 122 detected by the position circuitry 207.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data from the positioning system.

The optional workstation 128 is a general purpose computer including programming specialized for the following embodiments. For example, the workstation 128 may receive user inputs for defining the threshold level of the familiarity score. The workstation 128 may receive user inputs for modifying the levels of specificity applied to particular users. The workstation 128 includes at least a memory, a processor, and a communication interface.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components. The computing resources may be divided between the server 125 and the mobile device 122.

The database 123 of the system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The mobile device 122 may provide navigation-related features such as a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery.

Figure 9:
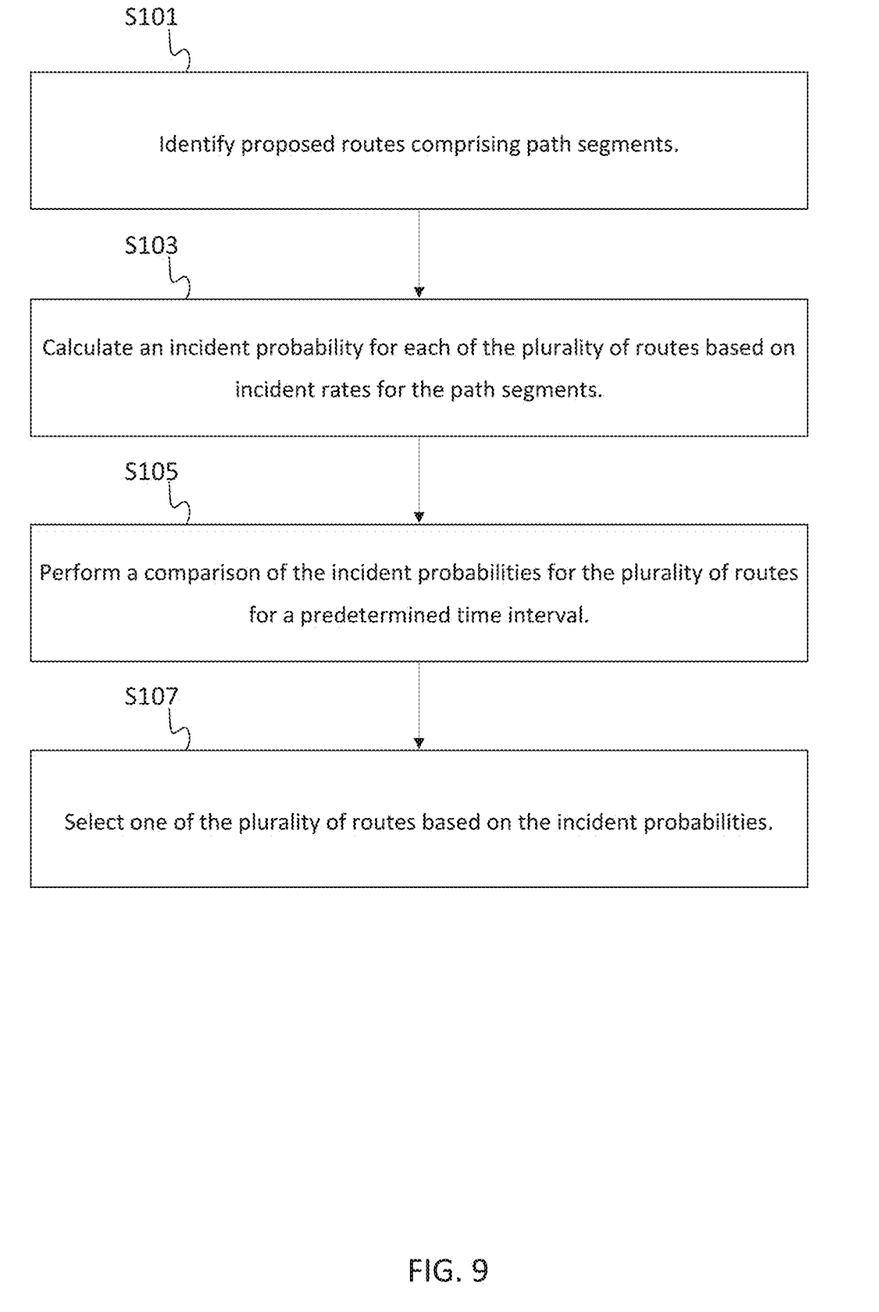
FIG. 9 illustrates example flowchart for ranking of path segments based on incident probability.

FIG. 9 illustrates example flowchart for ranking of path segments based on incident probability. The acts of FIG. 9 may be performed by mobile device 122, server 125, or a combination of mobile device 122 and server 125. Additional, different, or fewer acts may be provided.

At act S101, multiple proposed alternative routes to a destination are identified. Each of the routes includes a series of path segments. At act S103, an incident probability is calculated for each of the alternative routes based on incident rates for the path segments. The incident rates may be selected based on time epoch. The incident rates may include a historical component and a real time component. The historical component is based on how often an incident occurs on the path segment for each time epoch. The real time component is indicative of the likelihood of an incident based on current conditions. The current conditions may include events, weather, or detected traffic.

At act S105, the incident probabilities for the alternative routes are compared. The alternative routes vary in distance. The change in distance (i.e., the additional distance to travel to use a less incident prone route) may be weighed against the amount of improved safety. The comparison of the routes may be a function of a user risk preference. Risk averse users may prefer to select the least risky route even if significant travel time is added. Risk neutral users may prefer to select the shortest route even if more risky. Many users may be in between, and the riskiness of each user may be defined by a tradeoff value.

At act S107, one of the alternative routes is selected based on the comparison. A navigation application may allow a user to enter a destination and a risk preference. The route is provided via the navigation application based on the destination and the risk preference. An emergency response system (e.g., ambulance, fire, or police) may select a route based on the risk comparison. The emergency response system may plan and distribute rescue vehicles according to the incident probabilities in order to increase response time, thereby reducing traffic delays due to road blocks.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, and HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving a request for routing to a destination;
   identifying a plurality of routes to the destination;
   identifying a time interval;
   identifying a first incident probability function for a first condition defined by a first subset of historical data;
   identifying a second incident probability function for a second condition defined by a second subset of historical data;
   receiving data indicative of a real time condition;
   performing a comparison of incident probabilities for the plurality of routes and
   associated with the time intervals wherein the comparison is based on the first incident probability function when the first condition is included in the real time condition and based on the second incident probability function when the second condition is included in the real time condition; and
   Controlling a selection of one of the plurality of routes based on the comparison of incident probabilities.

2. The method of claim 1, wherein the incident probabilities include a distance component and an incident rate defined per unit distance.

3. The method of claim 1, wherein the incident probability for at least one of the plurality of routes is provided by a binary variable.

4. The method of claim 1, further comprising:
   receiving a risk preference setting, wherein the comparison of the plurality of routes is a function of the risk preference setting.

5. The method of claim 4, wherein the risk preference setting indicates either risk averse or risk neutral.

6. The method of claim 1, further comprising:
   receiving a vehicle type value, wherein the comparison of the plurality of routes is a function of the vehicle type value.

7. The method of claim 1, wherein the time interval is a time epoch associated with a time of day or a day of the week.

8. The method of claim 1, wherein the time interval is a function of traffic on a road segment.

9. An apparatus comprising:
   at least one processor; and
   at least one memory including computer program code for one or more programs; the at least one memory and the computer program code configured to, with the at least one processor, cause the apparatus to at least perform:
   identify a plurality of routes, wherein each of the plurality of routes comprises a series of path segments;
   identify a first incident probability function for a first condition defined by a first subset of historical data;
   identify a second incident probability function for a second condition defined by a second subset of historical data;
   receive data indicative of a real time condition;
   perform a comparison for the plurality of routes, wherein the comparison is based on the first incident probability function when the first condition is included in the real time condition and based on the second incident probability function when the second condition is included in the real time condition; and
   select a preferred route from the plurality of routes based on the comparison of incident probabilities for the series of path segments.

10. The apparatus of claim 9, wherein the computer program code is configured to, with the at least one processor, cause the apparatus to perform:
    receive data indicative of a current time,
    wherein real time condition is based on the current time.

11. The apparatus of claim 9, wherein the computer program code is configured to, with the at least one processor, cause the apparatus to perform:
    sum incident probabilities over time for the series of path segments.

12. The apparatus of claim 9, wherein the computer program code is configured to, with the at least one processor, cause the apparatus to perform:
    access data indicative of a risk preference for a user, wherein the comparison of the incident probabilities is a function of the risk preference for the user.

13. The apparatus of claim 12, wherein the risk preference for the user is selected from a low risk aversion level and a high risk aversion level.

14. The apparatus of claim 9, wherein the incident probabilities include a distance component and an incident rate defined per unit distance.

15. The apparatus of claim 9, wherein the incident probability for at least one of the plurality of routes is provided as a binary variable for peak travel times.

16. The apparatus of claim 9, wherein the incident probability describes a likelihood that the series of path segments includes traffic congestion at the predetermined time.

17. A non-transitory computer readable medium including instructions that when executed are operable to:
- identify a plurality of routes comprising path segments;
- identify a first incident probability function for a first condition defined by a first subset of historical data;
- identify a second incident probability function for a second condition defined by a second subset of historical data;
- receive data indicative of a real time condition;
- calculate an incident probability for each of the plurality of routes based on at least the first incident probability function when the first condition is included in the real time condition and based on at least the second incident probability function when the second condition is included in the real time condition;
- perform a comparison of the incident probabilities for the plurality of routes for a predetermined time interval; and
- Controlling a selection of one of the plurality of routes based on the incident probabilities.

18. The non-transitory computer readable medium of claim 17, wherein the instructions are configured to:
- receive a user risk preference setting, wherein the comparison of the plurality of routes is a function of the risk preference setting.

19. The non-transitory computer readable medium of claim 17, wherein the incident rates for the path segments are based on historical data for the path segments.

20. The method of claim 1, wherein the first condition is weather and the second condition is peak traffic.

21. The method of claim 1, wherein the first condition is rain and the second condition is snow.

* * * * *